United States Patent [19]

Vuletic

[11] Patent Number: 4,542,889

[45] Date of Patent: Sep. 24, 1985

[54] INSTALLATION FOR THE DIRECT PRODUCTION OF SPONGE IRON PARTICLES AND LIQUID CRUDE IRON FROM IRON ORE IN LUMP FORM

[75] Inventor: Bogdan Vuletic, Düsseldorf, Fed. Rep. of Germany

[73] Assignee: Korf Engineering GmbH, Linz, Austria

[21] Appl. No.: 639,149

[22] Filed: Aug. 9, 1984

Related U.S. Application Data

[62] Division of Ser. No. 551,174, Nov. 14, 1983.

[30] Foreign Application Priority Data

Nov. 15, 1982 [DE]  Fed. Rep. of Germany ....... 3242232
Aug. 5, 1983 [DE]  Fed. Rep. of Germany ....... 3328373

[51] Int. Cl.⁴ ............................................. C21B 13/14
[52] U.S. Cl. .................................... 266/137; 266/156; 266/160; 266/172; 266/200; 48/92
[58] Field of Search ............... 266/137, 156, 160, 172, 266/200, 900; 48/92

[56] References Cited

U.S. PATENT DOCUMENTS

| | | | |
|---|---|---|---|
| 2,747,988 | 5/1956 | Von Haken | 266/137 |
| 4,045,214 | 8/1977 | Wetzel et al. | 75/38 |
| 4,304,597 | 12/1981 | Keran et al. | 266/173 |
| 4,412,858 | 11/1983 | Viramontes-Brown et al. | 75/38 |
| 4,436,551 | 3/1984 | Mori | 75/38 |

Primary Examiner—Melvyn J. Andrews

[57] ABSTRACT

In a process for the direct production of sponge iron particles and liquid crude iron from iron ore in lump form, which is reduced in a direct reduction unit and fed in a hot condition to a melting gasifier, the sponge iron particles which are discharged from the direct reduction unit are separated into a fine grain fraction and a coarse grain fraction, and only the fine grain fraction is fed to the melting gasifier. That ensures economy of operation, without an excess of gas.

12 Claims, 4 Drawing Figures

INSTALLATION FOR THE DIRECT PRODUCTION OF SPONGE IRON PARTICLES AND LIQUID CRUDE IRON FROM IRON ORE IN LUMP FORM

This is a division of application Ser. No. 551,174, filed Nov. 14, 1983.

DESCRIPTION

The invention relates to a method and apparatus for producing sponge iron particles and liquid crude iron from iron ore in lump form, in a direct reduction unit from which the sponge iron particles are discharged to a melting gasifier. The term iron ore in lump form is used to denote iron ore in any lump or piece form, including therefore in the form of pellets.

A process and an installation of that kind are disclosed in DE-C2-30 34 539. In the known process, the operation of melting the sponge iron produces about 40% more reducing gas than is required for producing the same amount of sponge iron. In order for the installation to operate economically, it is necessary to have consumers for the excess gas. That means that the installation must be coupled to other installations. However, any coupling of a plurality of installations results in a reduction in the availability and viability of the overall installation, and thus results in impaired economy.

Depending on the iron ore used, larger pieces of sponge iron are also discharged from the reduction unit and pass rapidly through the fluidised bed of coal in the melting gasifier as such larger pieces of sponge iron are already moving at high speed when they pass into the quieting chamber in which their speed of downward movement increases further. By virtue of their short residence time in the fluidised bed of coal, they experience a correspondingly smaller rise in temperature. In contrast, small particles of sponge iron have longer residence times in the fluidised bed, are heated to a higher temperature, and undergo fusion more quickly.

The object of the present invention is to provide a process of the kind set forth in the opening part of this specification, which operates economically without an excess of gas and with which the specific output of the melting gasifier can be increased and the mode of operation thereof can be improved. Another object of this invention is to provide an installation for carrying out the process.

The process according to the invention is characterized in that the sponge iron particles discharged from the direct reduction unit are separated into a fine grained fraction and a coarse grain fraction and only the fine grained fraction is passed to the melting gasifier.

In the process according to the invention, it is not the total amount of sponge iron particles produced in the direct reduction unit that is fed to the melting gasifier, but only a portion of that amount, so that, when those particles are melted down, a smaller amount of gas is produced, whereby it is possible to avoid having an excess of reducing gas. The portion of sponge iron particles which is fed to the gasifier is selected insofar as the particle size is limited, in an upward direction. That ensures that larger pieces of sponge iron do not pass through the fluidised bed of coal without being sufficiently heated, and also ensuring that the fusion zone of the melting gasifier does not suffer from an accumulation of material which can only be melted by using an increased amount of energy. The coarse grain fraction which is separated out on the way from the reduction unit to the melting gasifier can be fed in a hot condition to a further melting vessel such as an electric arc furnace, but it can also be subjected to hot-briquetting, passivation or cooling, so as to provide a charge material for a smelting furnace.

As the process according to the invention provides that it is only the fine grain fraction that is melted down in the melting gasifier, difficulties may occur if the melting gasifier is supplied with non-refined, sulphur-rich coal. More specifically, because of the larger surface area of the fine sponge iron particles, with respect to weight, the fine grain fraction binds a greater proportion of the sulphur contained in the reducing gas, than the coarse grain fraction, so that the liquid crude or pig iron which is produced in the melting gasifier has an undesirably high increase in sulphur content. In that case, additional measures are required in order to reduce the sulphur content; those additional measures, being integrated into the process according to the invention, may comprise the following steps, individually or in combination:

1. A desulphurisation agent is fed to the melting gasifier;
2. The proportion of the crude gas produced by the gasification of coal, in the reducing gas, is decreased by admixing a portion of the waste gas from the direct reduction unit after a $CO_2$ scrubbing operation; and
3. The proportion of the fine grain fraction which is melted down in the melting gasifier is reduced in order to make a saving in the melting heat required, which in turn must be produced by burning coal.

With the step referred to in paragraph 3 above, it is also possible for the melting gasifier to be supplied with a portion of the waste gas from the direct reduction unit as an oxygen carrier, and for a part of the coal to be gasified by endothermic reactions with the carbon dioxide and the water vapour in the waste gas.

When the above-mentioned steps are carried out, the reduction in the sulphur content of the sponge iron particles of the fine grain fraction also causes a substantial reduction in the sulphur content of the sponge iron particles of the coarse grain fraction which are put to use elsewhere, so that, when those sponge iron particles are melted down, there is no longer any need to take particular steps to remove the sulphur therefrom.

If the operation of separating the sponge iron particles into a fine grain fraction and a coarse grain fraction is carried out directly after discharge from the direct reduction unit, then the coarse grain separator must be designed for temperatures of between 700° and 900° C. as the sponge iron particles leave the direct reduction unit at such temperatures. In some classification or sorting apparatuses, particularly when using screens, that can give rise to difficulties. In that case, it is desirable for the operation of sorting the sponge iron particles to be carried out only after a cooling operation has been performed. Preferably scrubbed and treated waste gas from the direct reduction unit is used as the cooling agent, for cooling the sponge iron particles before they are sorted out. In that case, it is desirable to take steps to ensure that the cooling agent cannot pass into the direct reduction unit by way of the sponge iron particle conveyor conduit.

The separated-out sponge iron particles are preferably cooled by means of cooled, cleaned and treated waste gas from the reduction unit, which, after heat exchange with the sponge iron particles, is admixed with the hot reduction gas flow from the melting gasifier to the reduction unit, for temperature control purposes. That mode of procedure also makes economic use of the waste gas from the reduction unit.

The operation of separating out the sponge iron particles of the coarse grain fraction increases the relative proportion of fine material in the sponge iron which is fed to the melting gasifier, and thus also increases the amount of fine material that may possibly be discharged from the gasifier. Therefore, in accordance with a development of the invention, the location at which the sponge iron particles are released within the melting gasifier is displaced downwardly from the top or cover of the vessel, into the vicinity of the upper boundary of the fluidised bed of coal. That is preferably effected by means of a gravity feed pipe which extends from above into the interior of the melting gasifier, into the vicinity of the upper boundary of the fluidised coal bed which is formed in the gasifier. In that way, it is also possible for the sponge iron particles to be introduced with a decelerated vertical velocity component, either by providing for suitable changes in the direction of flow thereof, by the provision of projections disposed in a cascade arrangement in the lower region of the gravity feed pipe, or by the provision of at least one baffle plate underneath the gravity feed pipe, which is preferably in the form of a truncated cone member, of a similar shape to a Chinese hat.

In order to provide for a metered feed of the sponge iron particles into the melting gasifier, a discharge means is advantageously provided between the coarse grain separator and the melting gasifier, wherein the gravity feed pipe or pipes is or are supplied with sponge iron particles in a controlled amount by the discharge means. In that way, it is also possible to increase the flow resistance in respect of the reducing gas which rises up by way of the gravity pipe, and it is possible to eliminate over-heating and sintering of the sponge iron particles in the region of the coarse grain separator and in the lower portion of the reduction unit.

The invention will be described in greater detail hereinafter by means of two embodiments with reference to four Figures of drawings in which.

Figure 1:
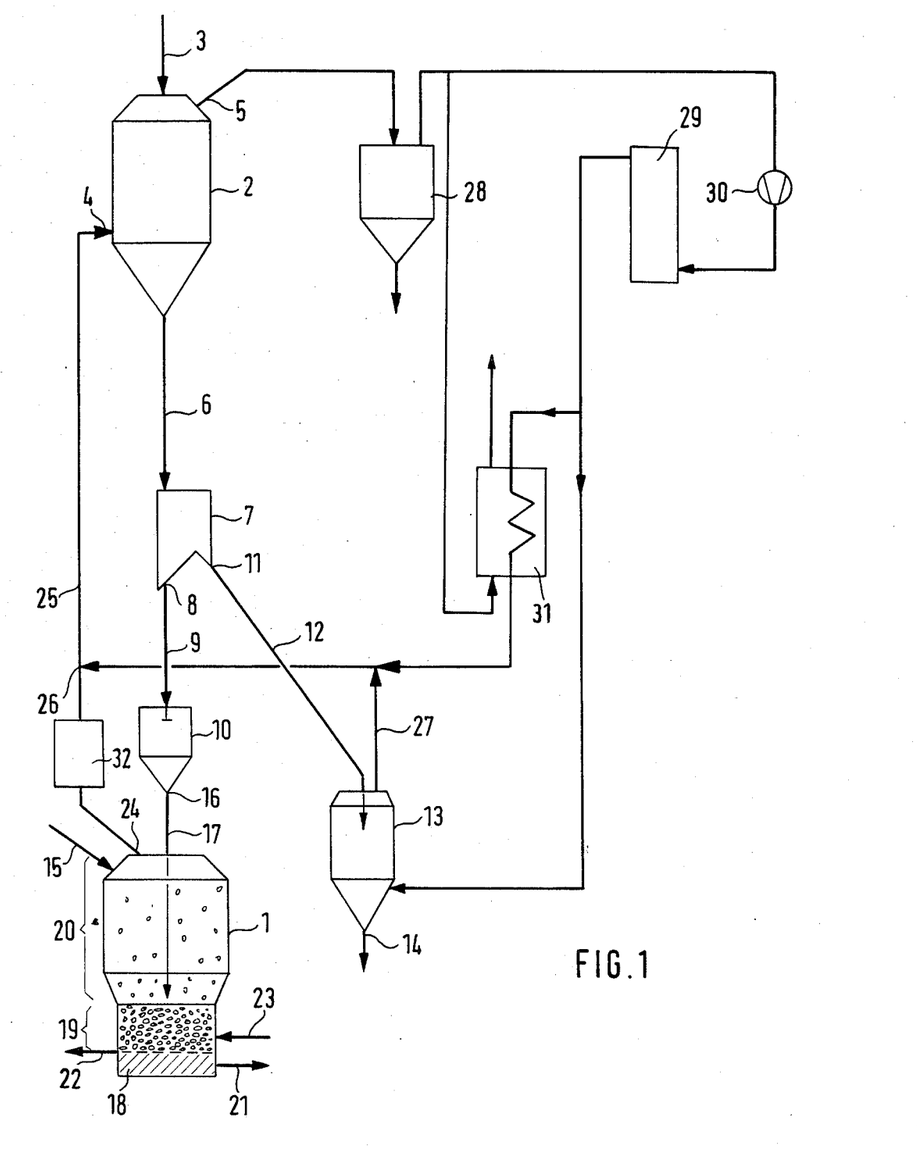
FIG. 1 is a diagrammatic view of a first embodiment of a process and installation in accordance with this invention.

The installation which is shown diagrammatically in FIG. 1, for the direct production of liquid crude or pig iron from ore in lump form includes a melting gasifier 1 of the kind described in EP No. B1-0 010 627. Disposed above the gasifier 1 is a shaft furnace 2 which, according to its mode of operation, can be compared to the upper part of a blast furnace or a direct reduction shaft furnace. The latter is described in principle for example in DE-A No. 29 35 707. The direct reduction shaft furnace is fed from above with iron ore in lump form, as indicated by an arrow 3, which moves downwardly in the shaft furnace in the form of a loose fill therein and which is reduced to sponge iron by means of a hot reducing gas which is blown in by way of a central gas inlet 4, at a temperature of about 750° to 900° C. The consumed or expended reducing gas, which is referred to hereinafter as waste gas, leaves the shaft furnace 2 by way of an upper gas outlet 5.

The hot sponge iron produced by reduction of the iron ore in lump form is discharged from the direct reduction shaft furnace 2 at the bottom thereof, at a temperature of about 750° to 850° C., and passes by way of a pipe 6 into a coarse grain separator 7. The separator 7 is of the configuration that will be described in greater detail hereinafter with reference to FIG. 3. Alternatively, it includes a screen which can be subjected to a thermal loading and which has a mesh size of for example 12 mm, by means of which sponge iron particles which are more than 12 mm in size are retained. The sponge iron particles are separated into a fine grain fraction and a coarse grain fraction. The sponge iron particles of the fine grain fraction leave the coarse grain separator 7 by way of a first outlet opening 8 and pass by way of a pipe 9 into a discharge means 10 which includes for example a screw or a reamer member. The sponge iron particles of the coarse grain fraction leave the coarse grain separator 7 through a second outlet opening 11 and pass by way of a pipe 12 to a cooling unit 13 in which they are cooled down to ambient temperature so that they can be conveyed, without a serious risk of re-oxidation, to the location at which they are to be processed. The discharge of the cooled sponge iron particles from the cooling unit 13 is denoted by reference numeral 14.

At its lower end, the discharge means 10 has an outlet opening 16 for the sponge iron particles, which is in communication with the interior of the melting gasifier 1 by way of at least one gravity feed pipe 17. The sponge iron particles are discharged in a metered fashion by way of the outlet opening 16. In that way, the charge materials which are required for charging the melting gasifier are continuously or intermittently fed thereto by way of the gravity pipe 17, in the amount required for the melting process in the gasifier. The coal which is required to form and maintain the fluidised bed of coal is fed directly to the melting gasifier 1 by way of a pipe 15.

As described in EP No. B1-0 010 627, the melting gasifier, in the operating condition thereof, may be subdivided into three portions, namely a lower portion 18 containing crude iron and slag, a middle portion 19 for the fluidised coal bed and an enlarged upper portion 20 which serves as a quieting or stabilising chamber. In accordance with a development of the invention, the feed of sponge iron particles into the gasifier 1 does not take place at the upper boundary of the quieting chamber 20 but within the quieting chamber 20, in the vicinity of the upper boundary of the fluidised coal bed 19. In the present case, that is effected by the gravity pipe 17 extending deep into the chamber 20. In that way, it is possible substantially to reduce the amount of fine grain material which is discharged from the melting gasifier with the gas and which, in the process according to the invention, plays a particular part, in relation to the total amount of sponge iron which is introduced into the melting gasifier. The best depth to which the pipe 17 extends into the gasifier can be easily ascertained by experiment. Desirably, the gravity pipe 17 terminates just above the upper boundary of the fluidised bed of coal.

The use of one or more gravity pipes 17 also makes it possible substantially to reduce the vertical velocity component of the downwardly moving material, thereby to increase the residence time of the sponge iron particles in the fluidised bed of coal. That reduction in vertical velocity component may be achieved by a direction-changing effect in respect of the pipes 17 at the lower end, or by the provision of baffle plates. The high thermal loading on a gravity pipe which extends into the interior of the melting gasifier means that it is desirable for the pipe to be cooled. A possible configuration of such a gravity pipe is described with reference to FIG. 2.

FIG. 1 also diagrammatically indicates the channels or spouts 21 and 22 for tapping off the crude iron and the slag, and also a nozzle or tuyere 23 for blowing in an oxygen-bearing gas.

The reducing gas which is produced in the melting gasifier 1 leaves the gasifier 1 by way of the outlet 24 thereof, at a temperature of about 1200° C. The gas is passed from there by way of the reducing gas conduit 25 to the gas inlet 4 of the direct reduction unit 2. As the reducing gas which is introduced into the direct reduction unit 2 may not exceed a temperature of 900° C., cooling gas which is supplied by way of a conduit 27 is admixed at the location indicated by reference numeral 26, with the hot reducing gas flow which flows upwardly in the conduit 25, for temperature control purposes. The cooling gas is recycled waste gas from the direct reduction unit 2 after that gas has been scrubbed and cooled in a waste gas scrubber 28 and the proportion of $CO_2$ therein has been reduced in a $CO_2$ absorption tower 29. Although the waste gas, after having been treated in that way, could be mixed in that form with the hot reducing gas from the melting gasifier, for temperature control purposes, the embodiment described herein provides that the treated waste gas was passed by way of the cooler 13 where it is in direct heat exchange relationship with the sponge iron particles of the coarse grain fraction, to effect cooling of those particles. In that heat exchange operation, the treated waste gas is increased in temperature to about 500° C. It is then mixed with the hot reducing gas flow in the conduit 25, by way of the conduit 27, at the location indicated at 26, in order thereby to reduce the temperature of the reducing gas flow to a value below 900° C. If more sponge iron than crude iron is to be produced in the installation, then a part of the treated waste gas must be preheated in the separate recuperator 31 which is connected in parallel with the cooling unit 13, in order to be able to set the desired bustle pipe gas temperature. The heating gas used should be the untreated waste gas, downstream of the waste gas scrubber 28, the amount of the gas used for that purpose being dependent on the amount of heat required. That arrangement also avoids enriching the recycle gas with inactive components such as $N_2$.

Reference numeral 30 in FIG. 1 denotes a compressor which is disposed upstream of the $CO_2$-absorption tower 29, to produce the pressure required. In order to be able to produce sponge iron which has a low sulphur content, the gas from the melting gasifier 1 must be subjected to desulphurisation in the hot gas desulphurisation unit 32. For that purpose, some cold gas can be added to the gas from the gasifier 1, in order to adapt the temperature thereof to the desulphurisation operation.

In order to avoid sintering, the amount of hot gases which pass upwardly through the pipes 17, 9 and 6 from the melting gasifier must be kept low. That can be achieved by virtue of a high flow resistance in the region of the discharge means 10, the gravity pipe 9 and the coarse grain separator 7, if the discharge is controlled in such a way that the pipe 9 is always at least partially filled with material. In that way, the resistance in the by-pass path, with respect to the reducing gas conduit 25, will be held at such a high level that there cannot be any harmful flow of gas through the above-mentioned by-pass duct.

Figure 2:
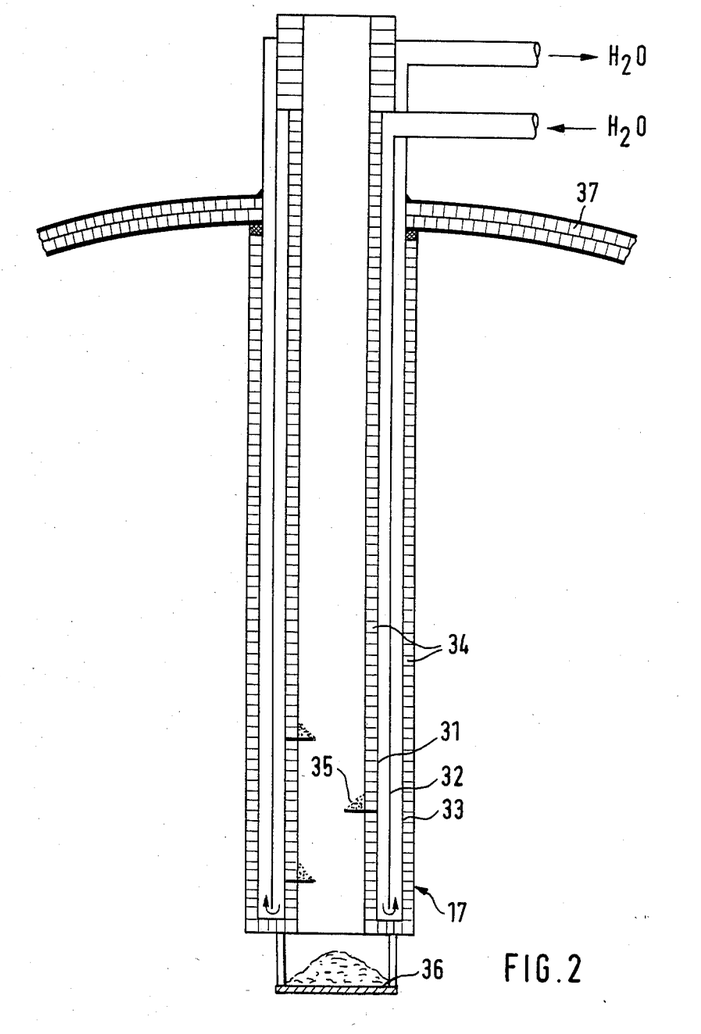
FIG. 2 is a view in longitudinal section of the configuration of a gravity pipe with liquid cooling.

FIG. 2 shows a sectional view of the part of a gravity feed pipe 17 which extends into the melting gasifier. Because of the high temperature in the interior of the melting gasifier, the pipe 17 is provided with a liquid cooling means. For that purpose, three metal pipes 31, 32 and 33 which are arranged concentrically with respect to each other, in the manner illustrated in FIG. 2, form a fluid duct through which a cooling fluid, for example water, is passed. The cooling system is covered on all sides with a refractory layer indicated at 34.

The illustrated gravity pipe 17 includes means for producing a change in the direction of the flow of sponge iron particles flowing downwardly through the pipe, thereby to reduce the vertical velocity of the particles and thus to increase the residence time thereof, by virtue of the reduced speed at which the particles go into the fluidised coal bed. For that purpose, disposed in the lower region of the gravity pipe 17 are projections 35 which are disposed in a cascade formation and on which material can be deposited, thereby to serve as a means for giving protection from wear. Instead of such projections or in addition thereto, it is also possible for a baffle plate 36 to be provided at the bottom discharge opening of the pipe, the baffle plate preferably being in the form of a truncated cone member, similarly to a Chinese hat. The downwardly moving sponge iron particles are deflected by the projections 35 in the pipe so as to follow a meandering path, and the speed of movement of the particles in the pipe is also reduced by the projections, while the baffle plate 36 causes the particles to be deflected approximately into a horizontal direction, thereby considerably reducing their vertical velocity component. Reference numeral 37 in FIG. 2 denotes the top of the melting gasifier.

Figure 3:
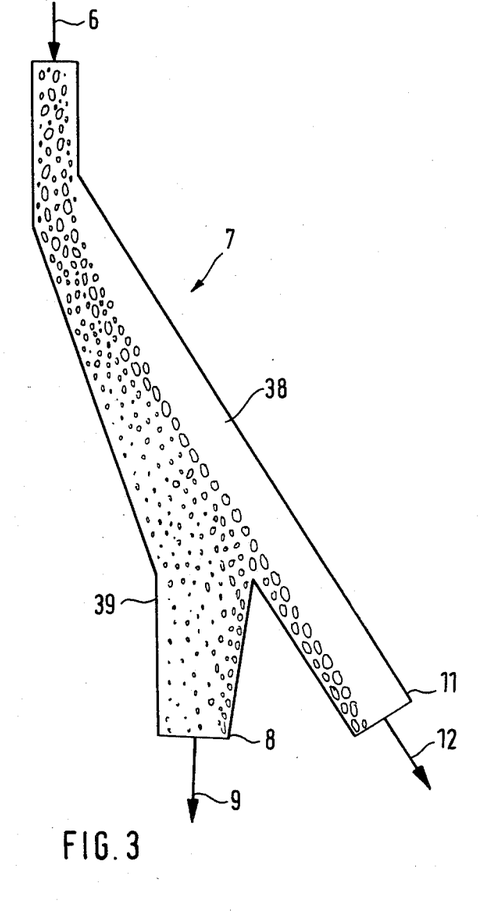
FIG. 3 is a diagrammatic view of a coarse grain separator.

The coarse grain separator 7 which is diagrammatically illustrated in FIG. 3 is in the form of an inclined gravity feed channel or chute 38 with at least one connecting means or connecting portion 39 which branches off downwardly from the channel 38. In the same manner as shown in FIG. 1, the pipe by way of which the sponge iron particles discharged from the direct reduction shaft furnace are fed to the separator 7 is denoted by reference numeral 6, while reference numeral 8 denotes the first outlet opening for the fine grain fraction and reference numeral 11 denotes the second outlet opening for the coarse grain fraction.

The loose or bulk material which passes into the coarse grain separator 7 from above is naturally separated into the components forming the mixture constituting that material, as it passes through the separator 7, that is to say, the fine particles settle downwardly and the coarse particles accumulate on the top. Suitably controlling the flow of sponge iron particles constituting the fine grain fraction, out of the first outlet opening 8, produces the flow configuration which is shown diagrammatically in FIG. 3, that is to say, the coarse sponge iron particles are substantially passed along to the second discharge opening 12, by way of the gravity feed pipe 38, and discharged at the opening 12. If the flow of fine sponge iron particles out of the separator 7 through the connecting portion 39 is controlled, as shown in FIG. 1, by a discharge means 10 which is connected to the coarse grain separator 7 by way of a pipe, then the flow resistance in respect of the gas which rises up out of the melting gasifier can be held at a comparatively high level, as required.

Figure 4:
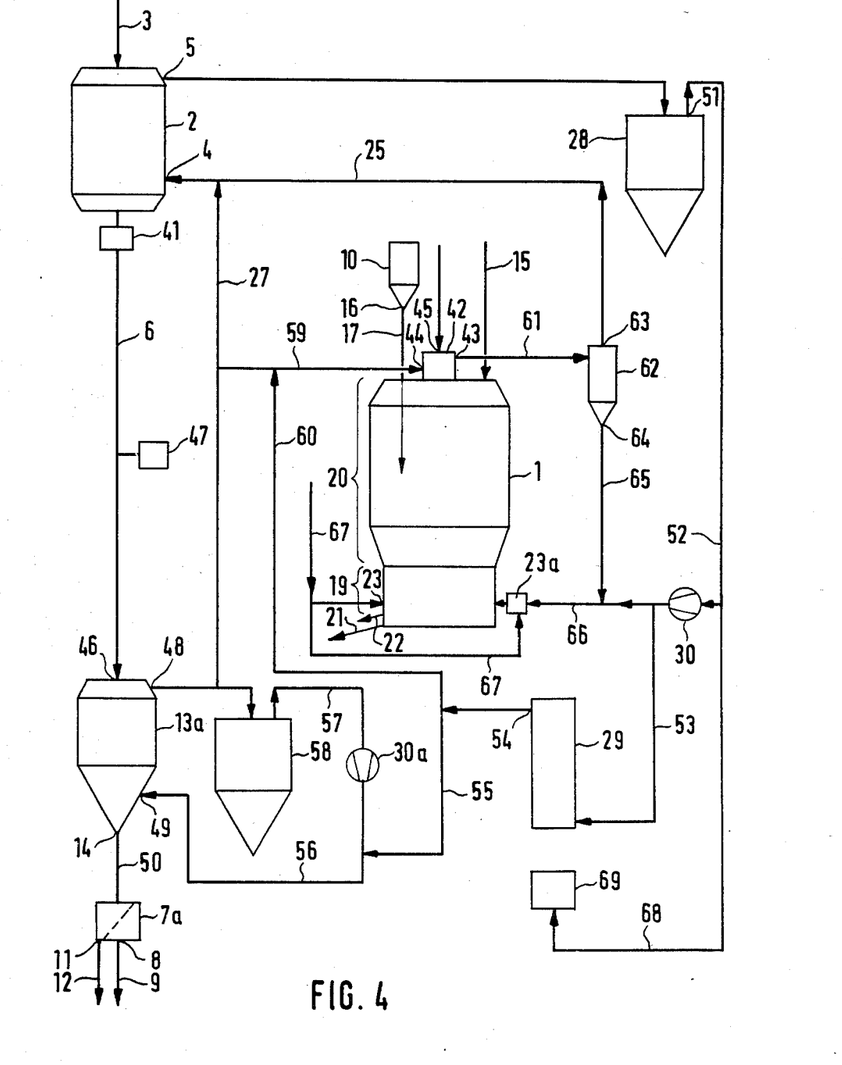
FIG. 4 is a diagrammatic view of a second embodiment of a process and installation in accordance with this invention.

In the diagrammatic view of a second embodiment of an installation, as shown in FIG. 4, the parts which are the same as in the installation shown in FIG. 1 are denoted by the same references.

A direct reduction unit which is in the form of a direct reduction shaft furnace 2 is provided at its top with a charging means 3 for the iron ore in lump form and a gas outlet 5 for the consumed or expended reducing gas (waste gas), while at its bottom, it has a controllable discharge means 41 for the sponge iron particles produced by direct reduction from the iron ore, and a gas inlet 4 for hot reducing gas. The melting gasifier 1 substantially corresponds to the gasifier of the first embodiment. In this embodiment however, the top or cover of the upper portion 20, which serves as a quieting or stabilising chamber, has a chamber which is referred to as the gasifier head portion 42 and which communicates with the quieting chamber 20. The gasifier head portion 42 has a gas outlet 43 for the reducing gas (crude gas) which is produced in the melting gasifier, a gas inlet 44 for scrubbed and treated waste gas from the direct reduction shaft furnace, and an inlet 45 for a desulphurisation agent. The pipe 15 for the coal feed and the dip pipe 17 for the introduction of the fine grain fraction are also passed through the top of the melting gasifier.

Provided in the lower portion of the melting gasifier are outlets 21 for liquid crude iron and 22 for liquid slag, while disposed above the slag level is at least one tuyere 23 or at least one blowpipe or burner 23a for blowing in gases and fine-grain solid materials.

Disposed underneath the direct reduction shaft furnace 2 is a cooling unit 13a for the hot sponge iron particles which are discharged through the discharge means 41. The intake opening 46 of the cooling unit 13a for the hot sponge iron particles communicates with the discharge means 41 through the gravity feed conduit 6. Associated with the gravity feed conduit 6 is a level measuring means 47 for controlling the discharge means 41.

In its upper region, besides the intake opening 46 for the hot sponge iron particles, the cooling unit 13a also has an outlet 48 for the cooling gas while in its lower region, besides an outlet opening 14 for the cooled sponge iron particles, the cooling unit 13a has an inlet 49 for the cooling gas. As in the embodiment described with reference to FIG. 1, the cooling action takes place in a counter-flow mode and in direct heat exchange relationship with the sponge iron particles which are moving downwardly in the cooling unit. As the cooling unit 13a is not only fed with the coarse grain fraction of the sponge iron particles, as in the embodiment shown in FIG. 1, it is desirable for the cooling unit to be provided in its upper region with a quieting chamber in order to minimise the amount of fine components discharged therefrom. That can be effected for example by the gravity feed pipe 6 being extended by a given length into the cooling unit so that a quieting chamber is formed above the cone-shaped surface of the material within the cooling unit.

Disposed below the cooling unit and connected to the outlet opening 14 thereof by means of a further gravity pipe 48 is a classification or sorting means 7a which is in the form of a screening station and which provides for separation of the sponge iron particles into a fine grain fraction and a coarse grain fraction. The outlet opening 8 for the fine grain fraction is connected by the conduit 9 to the fine grain container 10 which is disposed above the melting gasifier and which has an outlet opening 16 communicating with the dip pipe 17. As an alternative or in addition, it is possible to provide a connection to the pipe 15 by way of which the coal is introduced into the melting gasifier. If, due to the shortage of available space, the sorting means 7a is not arranged above the melting gasifier 1 and the conduit 9 cannot be in the form of a gravity feed conduit, then suitable conveyor means for conveying the fine grain fraction are to be provided in the conduit. If the separation operation in the sorting means 7a is performed in such a way that the fine grain fraction only contains portions with a grain size of up to 3 mm, then it may be desirable for at least a part of that fraction to be blown into the melting gasifier by way of the nozzles or tuyeres 23 or 23a respectively. Suitable conduits are then to be provided, for the nozzles or tuyeres.

Connected to the outlet opening 11 of the sorting means 7a for the coarse grain fraction which is separated out of the process is a conduit 12 for feeding the coarse grain fraction to a separate melting unit or a means for compacting or passivation or a further cooling unit 13, as shown in FIG. 1, to which treated waste gas is supplied, as the cooling agent.

As in the case of the embodiment described with reference to FIG. 1, a waste gas scrubber 28 is connected to the waste gas outlet 5 of the direct reduction shaft furnace and the gas outlet 51 of the waste gas scrubber 28 communicates by way of conduits 52 and 53 with a $CO_2$-absorption tower 29 having a gas outlet 54 which is connected by way of conduits 55 and 56 to the inlet 49 of the cooling unit 13a for the cooling gas. In addition, as in the first embodiment, the arrangement includes a conduit 27 from the gas outlet 48 of the cooling unit 13a to the reducing gas conduit 25, in order to mix treated waste gas which has been heated in the cooling unit 13a, with the reducing gas flow which is passed by way of the conduit 25 to the gas inlet 4 of the direct reduction shaft furnace 2. That arrangement not only provides for temperature control of the reducing gas which is fed to the direct reduction shaft furnace 2, but it is also possible for the consumption of coal and oxygen in the melting gasifier to be reduced to almost half. That also reduces to almost half, the amount of sulphur which is introduced with coal and the sulphur content in the reducing gas.

Supplementary to the installation shown in FIG. 1, the installation shown in FIG. 4 also includes the following pieces of equipment and connecting conduits.

Associated with the cooling unit 13a is a cooling gas circuit 57 which includes a conduit 56, with a cooling gas scrubber 58 and a compressor 30a. That arrangement takes account of the fact that the cooling operation in the cooling unit requires a larger amount of cooling gas than the available amount of treated waste gas which is supplied by way of the conduit 55.

From the conduit 27 which connects to the gas outlet 48 of the cooling unit or the cooling gas circuit 57, a conduit 59 branches off to the inlet 44 in the gasifier head portion 42. A connecting conduit 60, connecting to the gas outlet 54 of the $CO_2$-absorption tower 29, communicates with the conduit 59. Treated waste gas at different temperatures can be fed to the gasifier head portion 42 by way of the conduit 59 so that in this case the temperature can be adjusted to the optimum temperature for the hot gas desulphurisation operation.

The outlet 43 in the gasifier head portion 42 for the reducing gas which is produced in the melting gasifier 1 is connected by way of a conduit 61 to a cyclone 62; connected to the gas outlet 63 of the cyclone 62 is the reducing gas conduit 25 which leads to the direct reduction unit. Instead of a cyclone, it is also possible to use a plurality of cyclones which are connected together to form a cyclone battery. The outlet opening 64 for the solid materials which are separated out communicates by way of a conduit 65 with a conduit 66 which is connected by way of a compressor 30 to the gas outlet 51 of the waste gas scrubber 28. The conduit 66 carries a portion of the waste gas leaving the waste gas scrubber 28 to the burner or blowpipe 23a, as oxygen-bearing gas, that gas also serving as a carrier gas for the solid materials which are separated out in the cyclone 62. Oxygen can be fed to the burner 23a or the tuyeres 23 by way of a conduit 67. A branch conduit 68 goes from the conduit 52 which is connected to the gas outlet 51 of the waste gas scrubber 28, to a steam generator 69. Therefore, a part of the non-treated waste gas can be used as a heating gas for producing steam which is required in the $CO_2$-absorption tower 29.

Besides the requirement of avoiding an excess amount of reducing gas which is produced in the melting gasifier 1, the process when carried out with the installation shown in FIG. 4 also takes account in a particularly economical manner of the requirement that the sulphur content of the crude iron which is melted in the gasifier and in the coarse grain fraction of the sponge iron particles, which are separated out of the process, should be kept at a low level, if the energy carrier used in the process is coal which has a high sulphur content. For that purpose, means are provided for reducing the amount of energy required for melting the fine grain fraction in the melting gasifier and for feeding the process with the waste gas from the direct reduction unit, partly in an untreated condition and partly after a $CO_2$ scrubbing operation and after direct heat exchange in the cooling unit for the sponge iron particles which are discharged from the direct reduction unit.

The amount of energy which is required for producing the melting heat and which is to be produced by burning coal is reduced by virtue of the fact that, in the operation of separating the sponge iron particles in the classification or sorting means 7a, the proportion of the fine grain fraction relative to the coarse grain fraction is reduced, that is to say, the grain band of the fine grain fraction which is fed to the melting gasifier 1 is reduced to particles of up to 5 mm and preferably 3 mm in size. Because of the longer residence time in the fluidised bed of the melting gasifier, those particles can be melted down with a substantially smaller amount of energy, that is to say therefore with a smaller amount of coal and therefore a smaller amount of sulphur. It is then also possible for a part of the untreated waste gas which is supplied by the waste gas scrubber 28 and which contains carbon dioxide and water vapour, to be used for gasification of the coal. In the embodiment shown in FIG. 4, a part of the waste gas is fed by way of the conduit 66 to one or more burners or blowpipes 23a of the melting gasifier 1, which open into the fluidised bed of coal. Using the waste gas as a carrier gas, the discharge from the cyclone 62, namely desulphurisation agent and coal particles which are separated out of the reducing gas, is also recycled to the melting gasifier. In order to protect the injection opening from slagging or slag corrosion, the burner 23a is supplied with oxygen or air as a combustion agent, by way of the conduit 67, and a part of the waste gas or the waste gas-dust mixture is burnt. The amount of waste gas which is supplied by way of the conduit 66 should be so adjusted that the gasifier head portion temperature, in connection with other temperature control arrangements, is between 850° and 1250° C., preferably 1100° C. It will be appreciated that the possibility of using waste gas as an oxygen carrier for carrying out the gasification operation also permits the consumption of oxygen per tonne of product to be reduced, thereby increasing the economy of the process.

A further saving of coal and thus a further reduction in the sulphur content in the reducing gas and in the sponge iron may be achieved by waste gas which is treated in the $CO_2$ absorption tower being mixed with the reducing gas. In the process carried out with the installation shown in FIG. 4, that is effected by a part of the waste gas which is treated in the $CO_2$-absorption tower 29 being passed by way of the conduits 55 and 56 through the cooling unit 13a, with that part being heated in direct contact with the hot sponge iron particles, and a portion thereof then being passed to the reducing gas conduit 25 and a further part being passed to the gasifier head portion 42 by way of the conduit 59. The other part of the treated waste gas which is supplied by the $CO_2$ absorption tower 29 is fed directly to the gasifier head portion 42 by way of the conduit 60 and a part of the conduit 59. The amount of treated waste gas which is mixed with the reducing gas permits the consumption of coal and oxygen and thus also the amount of sulphur introduced with the coal and the sulphur content in the reducing gas, to be reduced to about half.

The treated waste gas which is supplied to the gasifier head portion 42 by way of the conduit 59 also provides for temperature control, wherein the temperature in the conduit 59 can be determined by the proportions of the amounts supplied by way of the conduit 27 and by way of the conduit 60. Temperature adjustment in the gasifier head portion is essential particularly when a desulphurisation agent is supplied to the gasifier head portion or the exhaust gas conduit 61 in order further to reduce the sulphur content in the reducing gas. The optimum temperature for hot gas desulphurisation is about 900° C. In the method described, the gasifier head portion 42 is supplied by way of an opening 45 with a desulphurisation agent such as calcium hydroxide in fine-grain form, and the optimum temperature for the hot gas desulphurisation operation is adjusted by the treated waste gas which is blown in through the gas inlet 44. Desulphurisation of the reducing gas is essentially effected in the gasifier head portion and in the exhaust gas conduit 61. Expended desulphurisation agent and desulphurisation agent which has not yet been expended are separated out in the cyclone 62 and recycled to the melting gasifier by way of the conduit 65.

The above-specified steps also make it possible, when using sulphur-rich coal, to reduce the sulphur content of the sponge iron particles to such an extent that the coarse grain fraction which is separated off can be processed in a steel works without further operations for removal of sulphur therefrom. The fine grain fraction which, for the above-stated reasons, has a substantially higher sulphur content than the coarse grain fraction—because the fine sponge iron particles have a larger surface area, in relation to weight, such particles bind a larger amount of sulphur—is at least partially desulphurised by the desulphurisation agent which is supplied to the melting gasifier, and separated out bound to the desulphurisation agent by the slag.

I claim:

1. Apparatus for production of sponge iron particles and liquid crude iron in lump form comprising a direct reduction means which is arranged above a melting gasifier means and which at its lower end has a discharge means for hot sponge iron, the outlet opening of said discharge means communicating with the melting gasifier means by way of at least one connecting conduit, a coarse grain separator means incorporated in the connecting conduit between the direct reduction means and the melting gasifier means, said separator means being provided with a separator outlet opening for a fine grain fraction communicating with the melting gasifier means and another opening for a coarse grain fraction communicating with a separate means.

2. Apparatus according to claim 1 wherein the coarse grain separator means is in the form of an inclined gravity chute having at least one connecting means which branches off downwardly therefrom and in which, when bulk material is conveyed therethrough, fine particles settle downwardly and are drawn off in a metered mode by way of said connecting means, while the coarse particles are passed downwardly along through said chute.

3. Apparatus according to claim 1 wherein coarse grain separator means includes a screen which is capable of being subjected to a thermal loading.

4. Apparatus according to claim 3 wherein said screen is provided with vibrator means to oscillate same.

5. Apparatus according to claim 1 wherein the discharge opening of the coarse grain separator means conveying the fine grain fraction communicates by way of at least one duct means with a container having a discharge means which is connected to the melting gasifier means by way of at least one gravity duct means.

6. Apparatus according to claim 5 wherein the gravity duct means extends from above into the interior of the melting gasifier means and into the vicinity of the upper boundry of a fluidized bed of coal which is formed in the melting gasifier means, and projections are provided in said gravity duct means in a cascade-like array, a baffle plate being disposed at the lower end of said gravity duct means.

7. Apparatus according to claim 6 wherein said baffle plate is in the form of a truncated cone.

8. Apparatus for production of sponge iron particles and liquid crude iron in lump form; comprising, a direct reduction shaft furnace which, at the top, has a charging means for iron ore in lump form and a gas outlet for expended reducing gas (waste gas), and, at the bottom, a discharge means for the sponge iron particles produced by direct reduction from the iron ore, and a gas inlet for hot reducing gas, a melting gasifier which, in an upper region, has openings for feeding thereto sponge iron particles, coal and additives, and a gas outlet for reducing gas produced (crude gas), and, in a lower region, outlets for liquid crude iron and liquid slag, and which also has, above the slag level, at least one tuyere for injecting gases and fine-grain solids, to form a gasification zone, cooling means for hot sponge iron particles, which, at the top, has an intake opening for the hot sponge iron particles and an outlet for the cooling gas and, at the bottom, a discharge opening for the cooled sponge iron particles and an inlet for the cooling gas, a waste gas scrubber connected to the waste gas outlet of the direct reduction shaft furnace, and conduit means for connecting said shaft furnace meeting gasifier, cooling means and waste gas scrubber, classification means for separating the sponge iron particles provided with a fine grain fraction outlet opening which is connected by conduit means to an upper opening of the melting gasifier and a coarse grain fraction outlet opening, a gas outlet means in the waste gas scrubber communicating with the tuyere in the lower portion of the melting gasifier.

9. Apparatus for production of sponge iron particles and liquid crude iron in lump form comprising, a direct reduction shaft furnace which, at the top, has a charging means for the iron ore in lump form and a gas outlet for the expended reducing gas (waste gas) and, at the bottom, a discharge means for the sponge iron particles produced by direct reduction from the iron ore, and a gas inlet for hot reducing gas, a melting gasifier which, in the upper region, has openings for the feed of spong iron particles, coal and additives, and a gas outlet for reducing gas produced (crude gas), and, in the lower region, outlets for liquid crude iron and liquid slag, and which also has, above the slag level, at least one tuyere for injecting gases and fine-grain solids, to form a gasification zone, a cooling means for hot sponge iron particles, which, at the top, has an intake opening for hot sponge iron particles and an outlet for cooling gas and, at the bottom, a discharge opening for cooled sponge iron particles and an inlet for cooling gas, a waste gas scrubber which is connected to the waste gas outlet of the direct reduction shaft furnace, and conduit means for connecting said shaft furnace, melting gasifier, cooling means and waste gas scrubber, classification means for separating the sponge iron particles provided with a fine grain fraction outlet opening connected by a conduit to an upper opening of the melting gasifier, and a coarse grain fraction outlet opening, the intake opening of the cooling means being connected by a gravity feed conduit to the discharge means of the direct reduction shaft furnace and the outlet opening of the cooling means being connected to the classification means.

10. Apparatus according to claim 8, wherein the intake opening of the cooling means is connected by a gravity feed conduit to the discharge means of the direct reduction shaft furnace and the outlet opening of the cooling unit is connected to the classification means.

11. Apparatus according to claim 8, wherein the gas outlet of the waste gas scrubber communicates with a $CO_2$-separator and the cooling gas inlet of the cooling unit communicates with the gas outlet of the $CO_2$-separator and the cooling gas outlet of the cooling unit communicates with an injection nozzle in the head portion of the melting gasifier means.

12. Apparatus according to claim 8, wherein the gas outlet for the reducing gas produced in the gasifier is connected to at least one cyclone separator and the discharge opening for the solid materials discharged from the cyclone separator communicates with the conduit from the waste gas scrubber to the lower tuyere of the melting gasifier.

* * * * *

UNITED STATES PATENT AND TRADEMARK OFFICE
CERTIFICATE OF CORRECTION

PATENT NO. : 4 542 889

DATED : September 24, 1985

INVENTOR(S) : BOGDAN VULETIC

It is certified that error appears in the above-identified patent and that said Letters Patent are hereby corrected as shown below:

On the title page;

[73] Assignee: KORF ENGINEERING GMBH, Dusseldorf
Federal Republic of Germany
and
VOEST-ALPINE AG, Linz, Austria Signed and Sealed this First Day of April 1986

[SEAL]

Attest:

DONALD J. QUIGG

Attesting Officer

Commissioner of Patents and Trademarks